March 26, 1940.    P. B. REEVES    2,195,226

EDGE DRIVE BELT

Filed March 7, 1939

INVENTOR.

Paul B. Reeves,

BY   Hood & Hahn.

ATTORNEYS.

Patented Mar. 26, 1940

2,195,226

UNITED STATES PATENT OFFICE 2,195,226

EDGE DRIVE BELT

Paul B. Reeves, Columbus, Ind., assignor to Reeves Pulley Company, Columbus, Ind., a corporation of Indiana Application March 7, 1939, Serial No. 260,346

15 Claims. (Cl. 74—237)

The present application relates to an edge drive belt, particularly designed for use in connection with variable speed transmissions of the "Reeves" type. The primary object of the invention is to provide a belt having sufficient tensile strength, suitable lateral rigidity to permit its use with V-type pulleys, and sufficient transverse flexibility to insure a proper engagement with the pulleys even at minimum effective diameters, but which shall be so constructed as to minimize the noise ordinarily caused, in belts of the general classification to which the present belt belongs, by the intermittent engagement of the ends of the transverse stiffener blocks with the coned surfaces of the pulley discs. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
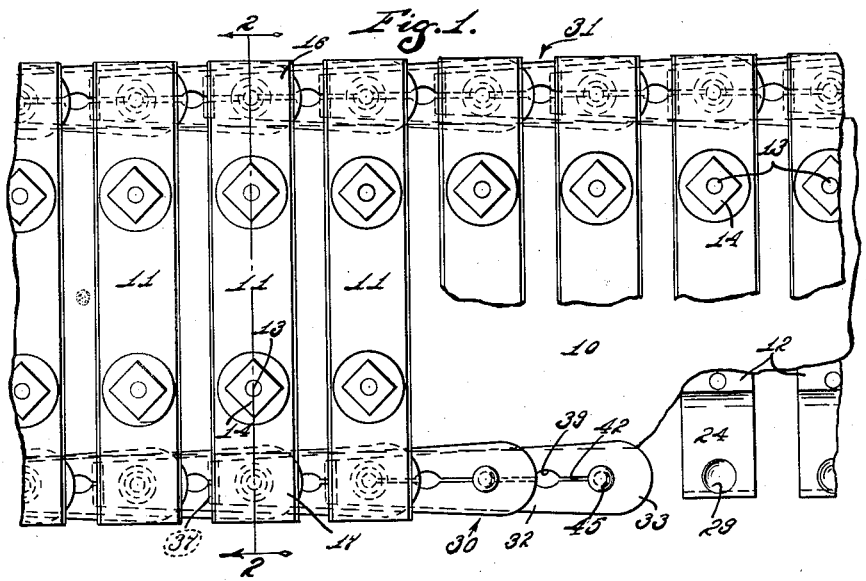
Fig. 1 is a fragmentary plan of a belt constructed in accordance with the present invention.
Figure 2:
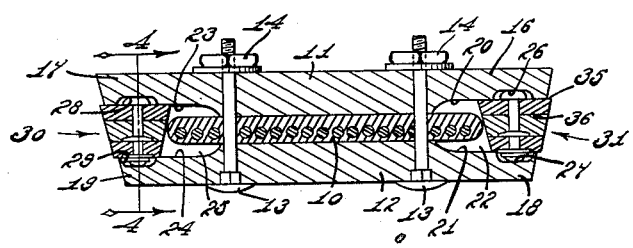
Fig. 2 is a transverse section thereof, taken substantially upon the line 2—2 of Fig. 1 and looking in the direction of the arrows.

While edge drive belts are used in many organizations, one of the most important uses for such belts is in variable speed transmissions of the expansible V-pulley type, most commonly known as "Reeves" drives. Among the essential characteristics of belts for such use are longitudinal tensile strength, ready flexibility about transverse lines to permit the belts to follow closely about small diameter pulleys, transverse rigidity to prevent lateral buckling of the belts between the discs of the pulleys, and a high coefficient of friction at the lateral edges of the belt.

In an effort to meet these requirements, the structure of the patent to M. O. Reeves 581,770 issued May 4, 1897, was produced; and that structure was used with reasonable success for many years. Somewhat later, it was found desirable to tip the ends of the transverse stiffener blocks with leather, or similar material, in the manner disclosed, for instance, in the patent to M. O. Reeves 1,446,017 issued February 20, 1923.

A defect of belts of the character disclosed in those patents lies in the fact that the lateral frictional surfaces are discontinuous, so that they are subjected to a pounding effect which tends to harden and glaze the frictional material, and which furthermore is objectionable because of the necessarily attendant noise. An effort to overcome these defects was made and is exemplified in the patent to Paul B. Reeves 1,862,198 issued June 7, 1932. According to that patent, a continuous friction strip is set into each lateral edge of the composite belt, between the projecting ends of the stiffener blocks, the lateral surface of such strip being flush with the friction surfaces of the block tips.

The structure of the last-mentioned patent constitutes an improvement over the structures previously used, but, because of the necessary thickness of the insert strips, those strips, particularly when subjected to long use of a character in which one of the transmission pulleys has a large effective diameter while the other has a very small effective diameter, become fatigued rather early in their lives, and lose their ready flexibility, while their frictional characteristics are materially damaged.

I have now devised an improvement over the belts of the above-mentioned patents, substituting for the continuous lateral friction strips of Patent 1,862,198, friction strips built up of a plurality of longitudinally overlapping elements, each of said elements being at least as thin as the main web of the belt, each of said elements being relatively short, but the thickness of the strip composed of such elements being everywhere materially greater than the thickness of the main web.

Referring more particularly to the drawing, it will be seen that I have illustrated a belt of the general character of those illustrated in the above-mentioned patents. Said belt is made up of a main web 10 of high longitudinal tensile strength, but of ready flexibility. Said web is transversely stiffened by a plurality of pairs of stiffener blocks 11 and 12, said blocks being secured to opposite surfaces of the web 10 in pairs, as illustrated, the pairs of blocks being longitudinally spaced along the web, and said blocks projecting laterally beyond the edges of said web. In the illustrated embodiment of the invention, the blocks 11 and 12 are secured together, in pairs, on opposite surfaces of the web 10, by bolts 13, each of said bolts passing through both blocks of a pair and through the web, and nuts 14 being applied to the bolts to secure the assembly. Preferably, the projecting ends of the bolts 13 will be riveted over against the nuts after the assembly has been completed.

The ends 16 and 17 of the blocks 11 project laterally beyond the edges of the web 10, as do the ends 18 and 19 of the blocks 12, it being noted, however, that the projections of the blocks 12 are less than the projections of the blocks 11, whereby the lateral surfaces of the block pairs are tapered inwardly. The adjacent faces 20 and 21 of the block ends 16 and 18 are relieved, to form a cavity or socket 22 having a depth or thickness greater than the thickness of the web 10. Similarly, the faces 23 and 24 of the block ends 17 and 19 are relieved to form a cavity 25 having a depth greater than the thickness of the web 10.

Near its extremity, the face 20 is formed with a socket 26, and the face 21 is formed with a mating socket 27, the sockets 26 and 27 being preferably vertically aligned. In the same way, the faces 23 and 24 are formed with mating sockets 28 and 29.

In the sockets 25 formed between the ends 17 and 19 of the various block pairs, is snugly received a friction strip, indicated generally by the reference numeral 30; and an identical friction strip indicated generally by the reference numeral 31, is received in the sockets 22 formed between the ends 16 and 18 of the block pairs. Since the strips 30 and 31 are identical, only one will be described.

Each friction strip is built up of a plurality of identical leaves 32. Each leaf is tapered from its end 33 to its end 34; and each leaf is likewise tapered from its outer surface 35 to its inner surface 36. The extremity of the end 34 is further beveled transversely, as at 37, from its surface 35 to its surface 36.

A hole 38 is formed in the end 34; and near the end 33, each leaf is formed with a buttonhole 39 communicating, by a slot 40, with a hole 41, substantially at the mid point of the longitudinal dimension of the leaf; and communicating, through a slot 42, with a hole 43 in the end 33.

Figure 4:
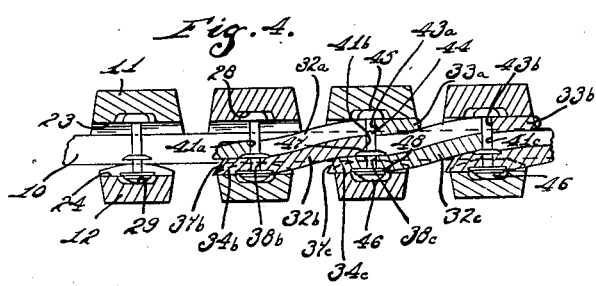
Fig. 4 is a longitudinal section taken substantially on the line 4—4 of Fig. 2 and looking in the direction of the arrows.
Figure 3:
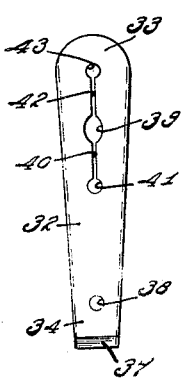
Fig. 3 is a plan view of a leaf element from which the lateral friction strips of the belt are made up.

The leaves are assembled in the manner illustrated in Figs. 1 and 4, being fastened together by rivets 44. Each rivet 44 comprises a head 45, a head 46, and an intermediate collar 47; a washer 48 preferably being mounted adjacent the head 46.

In Fig. 4, three leaves 32a, 32b, and 32c are shown assembled. It will be seen that the leaf 32a overlaps the mid portion of the leaf 32b and the end portion 34 of the leaf 32c. The three leaves are connected together by the rivet 44 which passes through the hole 38c of leaf 32c, the hole 41b of leaf 32b and the hole 43a of leaf 33a. The next adjacent rivet to the left in Fig 4 passes through the hole 38b of leaf 32b, through the hole 41a of leaf 32a, and through the hole in the end 33 of another leaf (not shown) which would be superposed upon the leaf 32a and which would project toward the left therefrom. The next adjacent rivet to the right projects through the hole in the end 34 of a leaf projecting toward the right, only a fragment of which is shown, through the hole 41c of the leaf 32c, and through the hole 43b, of the leaf 32b.

Each of the rivets 44 has its head 45 received in a socket 28, and each of the rivets 44 has its head 46 received in a socket 29.

It will be seen that each leaf 32 has its end 34 positioned in contact with a face 24, below the plane of the web 10, has its mid portion sandwiched between the end 34 of an adjacent leaf to its right and an end 33 of an adjacent leaf to its left; and has its end 33 positioned in contact with a face 23. Each leaf, thus, spans three block pairs, and overlaps portions of two adjacent leaves, being, in turn, overlapped by two other adjacent leaves.

Because of the peculiar conformation of the leaves 32 the cross sectional shape of the composite strip is a truncated, inverted triangle, so that the exposed lateral edge of each friction strip tapers from its outer to its inner end.

The two strips 30 and 31 thus form friction surfaces readily cooperable with a V-pulley.

While I have shown the lateral surfaces of the strips 30 and 31 projecting slightly beyond, and parallel with, the untipped end surfaces of the blocks 11 and 12, it will be understood that I may tip the ends of said blocks, in which case the exposed surfaces of the strips 30 and 31 may be either flush with, or parallel with and projecting slightly beyond, such tipped surfaces.

Because my friction strips are laminated, and the laminations are free to move slightly with respect to each other, the strips flex readily as the belt runs around a pulley, and said strips are not subjected to undue fatigue. As a consequence, I find that the life of the belt of the present application is materially greater than is the life of the belts of the above-mentioned patents; while the objectionable noise resulting from the pounding action of the pulley surfaces upon the ends of the stiffener blocks of belts like that illustrated in Patent 1,446,017 is substantially eliminated.

Because the engagement of the heads 45 and 46 of the rivets 44 in the sockets formed in the adjacent faces of the projecting block ends prevents the strips 30 and 31 from working out of the sockets 25 and 22; but because those sockets are somewhat larger than the rivet heads, slight movements of the rivets, and of the friction strips, with respect to the blocks 11 and 12 are possible, whereby wear and fatigue are minimized.

I claim as my invention:

1. An edge drive belt comprising a relatively thin main web, spaced transverse blocks secured to both surfaces of said web and projecting laterally beyond the edges of said web, and two strips of friction material carried by the opposite ends of said blocks and bridging therebetween, said friction strips having a relatively small dimension in the plane of the web and a dimension transversely of said plane substantially greater than the thickness of said web, and each of said strips consisting of a plurality of leaves, each leaf being tapered from end to end and from outer to inner surface, and each leaf having its wider end superposed upon the mid portion of another leaf and upon the narrower end of still another leaf.

2. An edge drive belt comprising a main web, a series of stiffener blocks secured to the opposite faces of said web in cooperating pairs, projecting laterally beyond the edges of said web, and spaced from each other longitudinally of said web, and two friction strips associated with the edges of said web, each of said strips comprising a plurality of leaves, a portion of each leaf being superposed upon a portion of at least one other leaf, and each strip being received between the projecting portions of said stiffener blocks beyond one edge of said web.

3. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, said strips being built up of a plurality of elements, each at least as thin as said web, and arranged in laminated relation.

4. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, said strips being built up of a plurality of elements, each at least as thin as said web, and each overlapping at least one adjacent element.

5. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, said strips being built up of a plurality of elements, each at least as thin as said web, and each overlapping the next two adjacent elements.

6. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, said strips being built up of a plurality of longitudinally extending elements, arranged in longitudinally overlapping relation, each of said elements being at least as thin as said web.

7. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, said strips being built up of a plurality of longitudinally extending elements, arranged in longitudinally overlapping relation, each of said elements being at least as thin as said web, and each having a longitudinal extent sufficient to span at least two adjacent block pairs.

8. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, said strips being built up of a plurality of longitudinally extending elements, arranged in longitudinally overlapping relation, each of said elements being at least as thin as said web, and each having a longitudinal extent sufficient to span at least two, and not more than three, adjacent block pairs.

9. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, each of said strips comprising a plurality of elements, each at least as thin as said web, arranged in longitudinally overlapping relation, and a plurality of rivets, each projecting through at least two overlapping elements and each received between a pair of projecting block ends.

10. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and a friction strip snugly received between said faces of the projecting portions of said pairs of blocks beyond each edge of the web, each of said strips comprising a plurality of elements, each at least as thin as said web, arranged in longitudinally overlapping relation, and a plurality of rivets, each projecting through at least two and not more than three overlapping elements, and each of said rivets being positioned between a pair of projecting block ends.

11. An edge drive belt comprising a readily flexible web of high tensile strength, a plurality of pairs of transverse stiffener blocks secured to said web and spaced longitudinally thereof, the blocks of each pair being positioned respectively on the outer and inner faces of said web, the ends of said blocks projecting laterally beyond the edges of said web, and the distance between adjacent faces of the projecting portions of the blocks of each pair being greater than the thickness of said web, and each of said faces being formed with a socket, and a friction strip snugly received between said faces of the projecting portions of said pairs of blocks beyond each edge of the web, each of said strips comprising a plurality of elements, each at least as thin as said web, arranged in longitudinally overlapping relation, and a plurality of rivets, each projecting through at least two overlapping elements and each having its opposite ends received in the sockets of a block pair.

12. An edge drive belt comprising a relatively thin main web, spaced transverse blocks secured to said web and projecting laterally beyond the edges of said web, and two strips of friction material carried respectively by the opposite ends of said blocks, said friction strips having a relatively small dimension in the plane of the web and a dimension transversely of said plane substantially greater than the thickness of said web, and each of said strips consisting of a plurality of leaves, each leaf being tapered from end to end and from outer to inner surface, and each leaf having its wider end superposed upon the mid portion of another leaf and upon the narrower end of still another leaf.

13. An edge drive belt comprising a main web, a series of stiffener blocks secured to said web and spaced longitudinally of said web, and two strips of friction material carried respectively by the opposite ends of said blocks and projecting laterally from said block ends, the overall lateral dimension of said blocks and strips being at least equal to the lateral dimension of said web, and each of said strips consisting of a plurality of leaves, each leaf being tapered from end to end and from outer to inner surface, and each leaf having its wider end superposed upon the mid portion of another leaf and upon the narrower end of still another leaf.

14. An edge drive belt comprising a main web, a series of stiffener blocks secured to said web and spaced longitudinally of said web, and two strips of friction material carried respectively by the opposite ends of said blocks and projecting laterally from said block ends, the overall lateral dimension of said blocks and strips being at least equal to the lateral dimension of said web, and each of said strips comprising a plurality of leaves, a portion of each leaf being superposed, in a direction perpendicular to the plane of the web, upon a portion of at least one other leaf.

15. An edge drive belt comprising a main web, a series of stiffener blocks secured to the opposite faces of said web in cooperating pairs, projecting laterally beyond the edges of said web, and spaced from each other longitudinally of said web, and two friction strips associated with the edges of said web, each of said strips comprising a plurality of leaves, a portion of each leaf being superposed upon a portion of at least one other leaf.

PAUL B. REEVES.